S. B. RAINS.
ART OF TREATING SILK.
APPLICATION FILED SEPT. 16, 1909.
992,803.
Patented May 23, 1911.
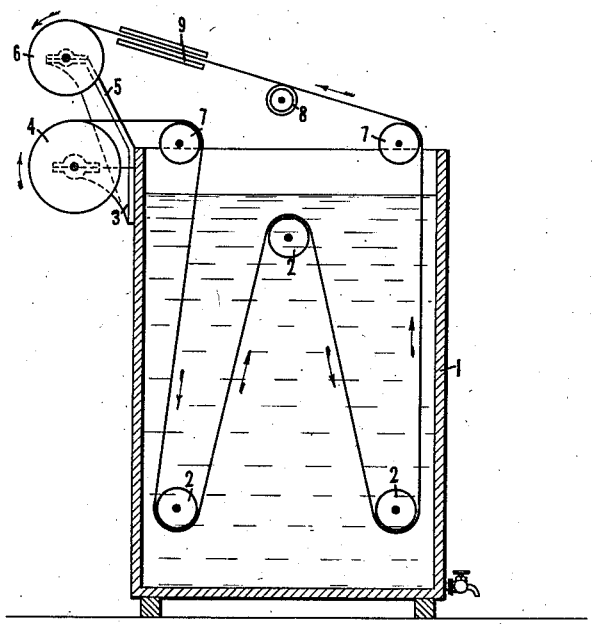
WITNESSES:
INVENTOR
S. B. Rains
BY
ATTORNEYS

UNITED STATES PATENT OFFICE.

SOLOMON B. RAINS, OF BROOKLYN, NEW YORK, ASSIGNOR OF ONE-HALF TO JAMES KEETON, OF BROOKLYN, NEW YORK.

ART OF TREATING SILK.

992,803.  Specification of Letters Patent.  Patented May 23, 1911.

Application filed September 16, 1909. Serial No. 517,975.

*To all whom it may concern:*

Be it known that I, SOLOMON B. RAINS, a citizen of the United States, residing at Brooklyn, in the county of Kings and State of New York, have invented certain new and useful Improvements in the Art of Treating Silk, of which the following is a full, clear, and exact description, such as will enable others skilled in the art to which it appertains to make and use the same.

This invention relates to the manufacture of silk and more especially to the art of treating silk to remove therefrom gum and other foreign matter.

One of the objects thereof is to formulate a practical art or method whereby silk is treated to remove therefrom the gum and foreign matter and afterward to dry and lay the fiber of the cleansed silk and to wind the finished product onto spools.

Another object is the attainment of these ends in a simple, efficient and inexpensive manner without repeated handling of the silk.

Other objects will be in part obvious and in part pointed out hereinafter.

The invention accordingly consists in the several steps and the relation and order of one or more of such steps with relation to each of the others thereof, which will be exemplified in the hereinafter disclosed art or method and the scope of the application of which will be indicated in the following claims.

The accompanying drawing shows diagrammatically a form of apparatus which may be used in carrying out this art.

As tending to a more ready understanding of certain features of this invention, it may here be noted that if it is attempted to treat the thread for the removal of these foreign substances after it has been reeled into skeins, it will be found that the silk has to undergo several distinct operations and is necessarily handled many times. Such a treatment, therefore, involves considerable labor and expense and the product itself is appreciably weakened by the many handlings it has to suffer and the results lack uniformity.

This invention aims to provide a simple and practical art or method whereby the above and other defects and difficulties are remedied.

In carrying out the illustrative method shown in the drawing, there is provided a tank 1 for the boiling-off liquor. Extending transversely of this tank are arranged a plurality of porcelain rollers 2 arranged in staggered relation near the top and bottom of said tank. Mounted upon the side of the tank are brackets 3 adapted to support therebetween reels or spools 4. Brackets 5 are also mounted upon the side of the tank to support spools 6. Spool 4 is adapted to rotate freely in its supporting brackets and spool 6 may be driven in any desired manner for the purpose hereafter set forth. Rollers 7 supported near the top of the tank 1 simply serve to lead the thread to and away from the rollers 2. 8 is a finishing or burnishing roll adapted to be heated, the object of which will be described hereafter. Adjacent the bracket 5 there is provided a thread conduit 9 adapted to lay the thread upon the spool 6 in any suitable manner.

The operation follows: Upon spool 4 is wound the silk as it comes from the spinners, and at that stage in its manufacture it contains a considerable quantity of the gums and other foreign matter inherent in the raw material. One or more of these spools of spun or thrown silk is placed between the brackets 3, and the loose end of the thread is led over the various rollers and through the boiling-off liquor in the tank 1. From the last of the idler rollers 7 the silk is conducted in proximity to the finishing roll 8, which is heated to the proper temperature for completely drying and laying the fiber of the thread as it passes. The end of the thread is then led through the conduit 9 and onto the taking-off spool or reel 6, upon which it is wound in its cleansed and finished condition. In passing through the boiling-off liquor all of the foreign substances aforesaid are removed and the thread when wound upon the taking-off spool 6 is in finished condition and ready for use as desired. It is to be understood that if desired, the silk in the single thread can be taken from a large creel or jack, passed through the boiling-off liquor and then utilized directly in the so-called operation of warping. This would obviate the rewinding operation and save needless expense whenever it is found desirable to immediately warp the thread.

It should be understood that while various boiling off solutions may be used in carrying out this art, a liquor of the following constituency has been found by applicant to produce high grade results. For approximately every hundred pounds of silk degummed a water solution is used containing about 30 per cent. soap, 2½ per cent. bicarbonate of soda, and 2½ per cent. sal soda. The liquor is maintained at about 212° F. The silk is completely degummed in thirty seconds and when dry may be used immediately in the manufacture of silk fabrics, or dyed in the thread if such product is desired.

It will be seen from the above description that there is provided an art or method of treating silk whereby all of the objects heretofore set forth are attained in a simple and practical manner. It will also be noted that the silk is boiled off evenly and thoroughly whereby it is freed from all gums and foreign substances and a finished product is obtained, which, while clean, remains strong and uninjured by excessive handling.

In view of the foregoing disclosure, it will be obvious to those skilled in its art that this process may be carried out in different ways from those specifically referred to, and with the assistance of various forms of apparatus, without, however, departing from the scope of this invention, and accordingly it is intended that all matter contained in the above description shall be interpreted as illustrative and not in a limiting sense. It is also to be understood that the language adopted in the following claims is intended to cover all of the generic and specific features of the herein-disclosed invention, and all statements of the scope thereof which as a matter of language might be said to fall there between.

Having described my invention, what I claim as new and desire to secure by Letters Patent, is:

1. The art of treating silk, which comprises drawing the silk lengthwise through boiling-off liquor.

2. The art of treating silk, which comprises leading a thread from a spool of thrown silk through boiling-off liquor.

3. The art of treating silk, which comprises leading a thread from a spool of thrown silk first through a vat containing a suitable boiling-off liquor to remove gum and other foreign matter, and then in proximity to a finishing roller whereby the silk is dried and the fiber laid.

4. The art of treating silk, which comprises leading silk in the thread through a boiling-off liquor, then passing the thread in proximity to a heated roller and finally winding it on a spool.

5. The art of treating silk, which comprises leading thrown silk from spools through a boiling-off liquor, drying and laying the fiber, and re-winding on other spools.

6. The art of treating silk, which comprises passing thrown silk in the single thread through boiling off liquor.

7. The art of treating silk, which comprises leading a thread from a spool of thrown silk through suitable boiling off liquor whereby gum and other foreign matter is removed therefrom.

8. The art of treating silk, which comprises leading a thread of thrown silk from spools through a boiling off liquor, drying and laying the fiber, and rewinding on other spools.

In testimony whereof I affix my signature, in the presence of two witnesses.

SOLOMON B. RAINS.

Witnesses:
HELEN M. SEAMANS,
EVERETT J. PECK.